United States Patent
Hou et al.

(10) Patent No.: US 9,634,602 B2
(45) Date of Patent: Apr. 25, 2017

(54) THREE-PHASE INVERTER APPARATUS AND CONTROL METHOD THEREOF

(71) Applicant: FUJI ELECTRIC CO., LTD., Kawasaki-shi (JP)

(72) Inventors: Hao Hou, Kobe (JP); Hidenobu Tsuchihashi, Kobe (JP); Masamitsu Takizawa, Suzuka (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/042,124

(22) Filed: Feb. 11, 2016

(65) Prior Publication Data

US 2016/0268922 A1 Sep. 15, 2016

(30) Foreign Application Priority Data

Mar. 10, 2015 (JP) ................................. 2015-046716

(51) Int. Cl.
| | |
|---|---|
| *H02P 25/08* | (2016.01) |
| *H02P 27/06* | (2006.01) |
| *H02M 1/12* | (2006.01) |
| *H02M 7/5387* | (2007.01) |

(52) U.S. Cl.
CPC .............. *H02P 27/06* (2013.01); *H02M 1/12* (2013.01); *H02M 7/53873* (2013.01)

(58) Field of Classification Search
CPC ................................. H02P 25/89; H02P 23/14
USPC ...................................................... 318/254.1
See application file for complete search history.

(56) References Cited

U.S. PATENT DOCUMENTS

| | | | |
|---|---|---|---|
| 6,172,509 B1* | 1/2001 | Cash | G01R 31/346 318/434 |
| 9,013,839 B1* | 4/2015 | Vander Laan | H02H 3/093 361/23 |
| 2003/0042865 A1* | 3/2003 | Mayhew | H02P 1/24 318/727 |
| 2006/0012329 A1* | 1/2006 | Aoki | H02P 21/18 318/721 |
| 2015/0180384 A1* | 6/2015 | An | F25B 1/005 62/498 |

FOREIGN PATENT DOCUMENTS

| | | |
|---|---|---|
| JP | H04-340369 A | 11/1992 |
| JP | 2006-325326 A | 11/2006 |

* cited by examiner

*Primary Examiner* — Erick Glass
(74) *Attorney, Agent, or Firm* — Rabin & Berdo, P.C.

(57) ABSTRACT

A three-phase inverter apparatus includes an inverter main circuit in three phases having a plurality of semiconductor switching devices to convert a DC voltage into the three-phase AC voltages to be supplied to a pulsating load, a current detector configured to detect first and second output currents from the inverter main circuit, a voltage detector configured to detect first to third output voltages from the inverter main circuit, and a control circuit configured to generate a command compensation value using a value obtained by dividing a current RSM obtained from the first and second output currents by an average value of the current RSM, and generate the compensated control command for each of the switching devices by multiplying the command compensation value by a corresponding one of control commands each of which is generated for a corresponding one of the switching devices, using the first to third output voltages.

11 Claims, 6 Drawing Sheets

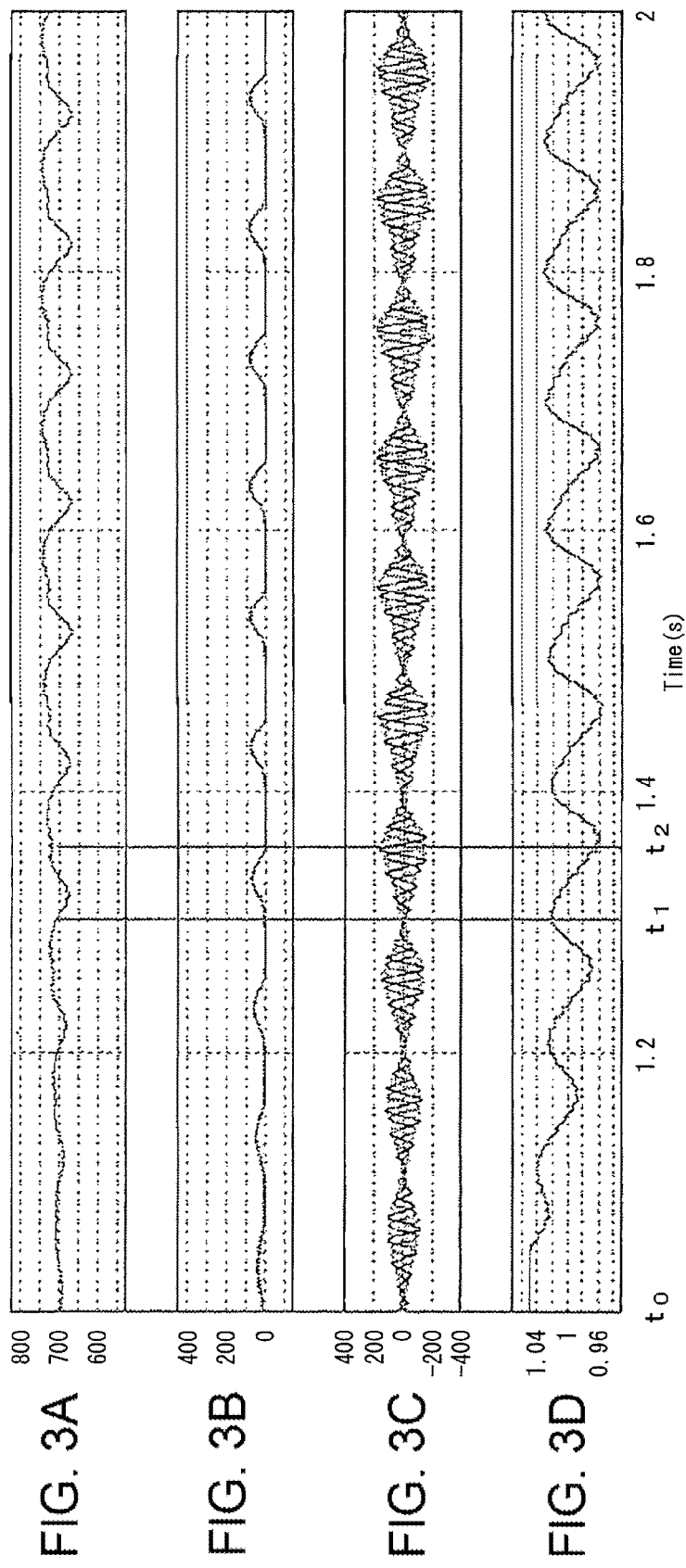

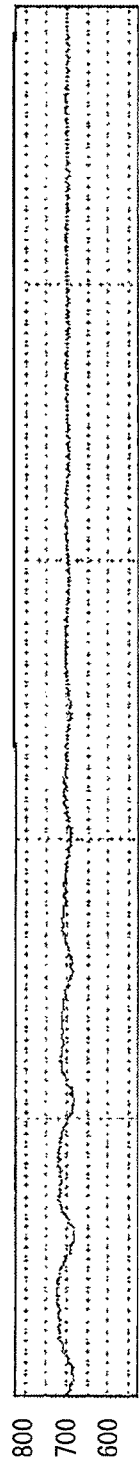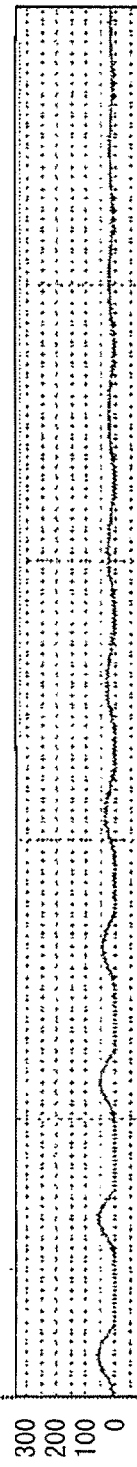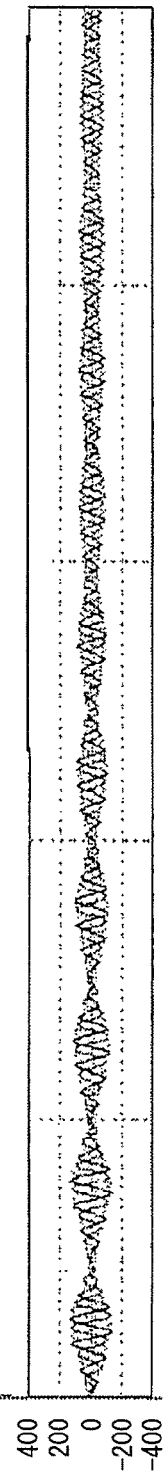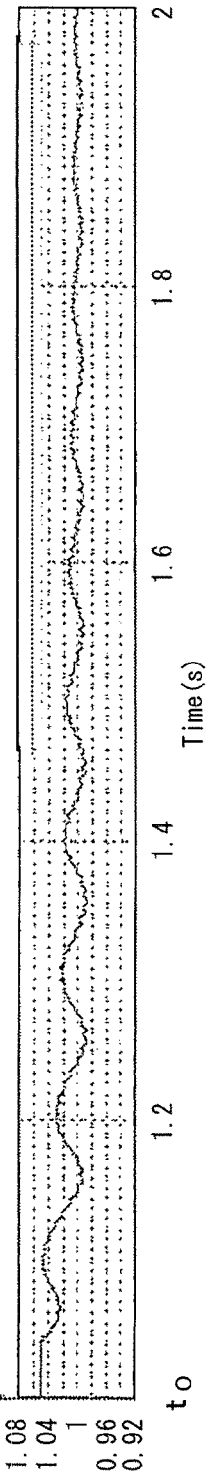
FIG. 4A
FIG. 4B
FIG. 4C
FIG. 4D

THREE-PHASE INVERTER APPARATUS AND CONTROL METHOD THEREOF

BACKGROUND OF THE INVENTION

1. Field of the Invention

The present invention relates to a three-phase inverter system that converts a DC voltage to three-phase AC voltages to supply the AC voltage to a pulsating load such as an induction motor that causes ripples and the control method of the system.

2. Background Art

In a three-phase inverter system for a rolling stock in a DC feeding system, for example, a DC voltage inputted from a pantograph is converted into a three-phase AC voltage by the operation of an inverter section and is supplied to a compressor motor as a driving source of a breaking system, a door driving system and an air-conditioning facility and to a resistive load such as a fluorescent lamp.

Here, a compressor motor has the property of causing an input current to periodically pulsate depending on the number of the cycle of compressing air. This presents a problem in that voltage drops are periodically produced on the input side of the compressor motor due to the presence of a circuit element such as a filter to thereby cause voltage fluctuation to make fluorescent lamps flicker which are connected to the same feed line.

Against this, in JP-A-4-340369 (paragraphs [0015] to [0030] and FIG. 1 etc.), a technology (a first related art) is disclosed which suppresses voltage fluctuations produced when a compressor motor is driven to prevent fluorescent lamps from flickering in a three-phase inverter system for a rolling stock.

FIG. 5 is a diagram showing the whole configuration of a three-phase inverter system according to the first related art.

In FIG. 5, the output of a DC-to-DC converter 103 being connected between a pantograph 101 and a wheel 102 is inputted to a three-phase inverter system 200.

The three-phase inverter system 200 is provided with an inverter bridge 201, a waveform shaping circuit formed of AC reactors 202 and capacitors 203 connected onto the AC output side of the inverter bridge 201, a transformer 204 connected onto the AC output side of the inverter bridge 201 and a diode bridge 205 connected onto the output side of the transformer 204. The three-phase inverter system 200 is further provided with an inverter control circuit 220 and a driving circuit 206 that drives the inverter bridge 201 by the output of the inverter control circuit 220.

The inverter control circuit 220 is provided with a reference voltage generator 221, a lag element of first order 222 that provides a time-lag of first order to the difference between the output voltage value of the diode bridge 205 and the reference voltage value and a PWM (Pulse Width Modulation) converter 223.

On the output side of the three-phase inverter system 200, in addition to the foregoing, a load fluctuation compensating circuit 210 is provided. The load fluctuation compensating circuit 210 is provided with current transformers 211 detecting the AC outputs of the three-phase inverter system 200, a diode bridge 212 connected to the current transformers 211, a band-pass filter 213 connected onto the output side of the diode bridge 212, an amplifier 214 and a phase-shift circuit 215. The phase-shift circuit 215 is connected to the inverter control circuit 220 so that the output of the phase-shift circuit 215 is added to the output of the lag element of first order 222 in the inverter control circuit 220.

The output of the three-phase inverter system 200 outputted from the load fluctuation compensating circuit 210 is supplied to a compressor motor (an induction motor) M.

In the load fluctuation compensating circuit 210, AC output currents detected by the current transformers 211 are converted into a DC voltage containing the foregoing voltage fluctuation as the component thereof through the diode bridge 212. From thus converted DC voltage, only the fluctuating component therein is extracted with ripples with the frequency of the power supply eliminated by the band-pass filter 213. The fluctuating component is thereafter amplified by the amplifier 214. The output voltage of the amplifier 214 is then inputted to the phase-shift circuit 215 in which the phase of the voltage is shifted by 180 degrees, by which a compensation signal is produced for cancelling the fluctuating component. The compensation signal is inputted to the inverter control circuit 220 to thereby execute interruption to the voltage control.

In the inverter control circuit 220, the difference between the value of the reference voltage from the reference voltage generator 221 and the detected value of the output voltage from the diode bridge 205 is inputted to the lag element of first order 222, in which the arithmetic operation on the conduction ratio for PWM control is carried out. To the operated conduction rate, the value of the compensation signal is added, by which the conduction ratio is corrected and the corrected conduction ratio is inputted to the PWM converter 223 at which the inputted conduction ratio is converted into turning-on and -off signals for the semiconductor switching elements in the inverter bridge 201. On the basis of the turning-on and -off signals, the semiconductor switching elements are made to be turned-on and -off through the driving circuit 206, by which fluctuations in the output voltages of the three-phase inverter system 200 due to the operation of the compressor motor M are suppressed to prevent fluorescent lamps from flickering.

In addition, in JP-A-2006-325326 (paragraph [0010] etc.), a three-phase inverter system (a second related art) is described with an object of stabilizing an output voltages like the three-phase inverter system disclosed in JP-A-4-340369.

In the second related art, as is shown in FIG. 6 as a diagram showing the configuration of the principal part of the three-phase inverter system according to the second related art, a reactive current $i_Q$ including a fluctuating component is detected on the output side of the three-phase inverter system and the difference between the value of the detected reactive current $i_Q$ and the value of a reactive current, which is provided by making the detected reactive current $i_Q$ pass through a low-pass filter 301 to be averaged, is obtained. The difference is then multiplied by a proportional gain 302 (K) and an output Δf as the result of the multiplication by the proportional gain 302 is added to a reference frequency f for obtaining the final frequency command f* of the three-phase inverter system, by which the output voltage of the system is made to be stabilized.

In the three-phase inverter system according to the first related art shown in FIG. 5, when the effect of suppressing low frequency fluctuating components in the output voltages was verified by using an induction motor as a load and using the band-pass filter 213 with the center frequency thereof at a power frequency (50 Hz or 60 Hz), it was shown that even though the compensation signal from the load fluctuation compensating circuit 210 was used, the frequency of the compensation signal had a large deviation from the actual low frequency fluctuating component to sometimes make it impossible to sufficiently suppress the fluctuations in the output voltages.

In addition, compensation carried out by extracting only the fluctuating component of an output current therefrom causes an excessively small or large effect of suppression on some average values of root mean square values of output currents even though the fluctuation widths of low frequency current components thereof are equal to make it impossible to obtain a proper effect of suppression.

Furthermore, addition of a compensation signal to the difference between the value of the reference voltage and the detected value of the output voltage in the three-phase inverter system is equivalent to introducing disturbance to the value of an output voltage command. Therefore, when the gain of the compensation signal is high, the output voltages of the three-phase inverter system became sometimes impossible to be kept constant.

Moreover, in the three-phase inverter system according to the second related art shown in FIG. 6, only by compensating the frequency command with the use of the compensation signal proportional to the difference between the reactive current and the reactive current after passing through the low-pass filter, it was difficult to sufficiently suppress the fluctuations in the output voltages of the three-phase inverter system.

Accordingly, it is an object of the present invention to provide a three-phase inverter system and the control method thereof which can suppress fluctuations in the voltages and currents which are inputted and outputted better than the related ones did.

SUMMARY OF THE INVENTION

For achieving the foregoing object, the three-phase inverter system according a first aspect of the invention is a three-phase inverter system which includes an inverter main circuit in three phases having a plurality of semiconductor switching devices and a control circuit having the detected values of the output currents and the detected values of the output voltages inputted to produce the driving signals turning-on and -off the semiconductor switching devices, and which converts a DC voltage into three-phase AC voltages by the turning-on and -off operations of the semiconductor switching devices to supply the converted three-phase AC voltages to a load. The system is one for driving a pulsating load such as an induction motor.

The invention is then characterized in that the control circuit includes a root mean square value operation section carrying out an arithmetic operation on the root mean square value of the output currents of the inverter main circuit, an average value operation section carrying out an arithmetic operation on the average value of the output currents, a division section carrying out division of the root mean square value by the average value, a compensation value operation section carrying out an arithmetic operation on a command compensation value proportional to the value of the output of the division section, and a multiplication section multiplying control commands for the semiconductor switching devices in the inverter main circuit by the command compensation value to compensate the control commands, the control commands being operated on the basis of the differences between the output voltages and their respective output voltage command values, and determines the turning-on and -off times of the driving signals by the compensated control commands outputted from the multiplication section.

Moreover, the three-phase inverter system according to a second aspect of the invention is one in which the three-phase inverter system according to the first aspect forms a power supply system driving an induction motor as the pulsating load in an electric rolling stock on a DC feeding system.

Furthermore, the control method of a three-phase inverter system according to a third aspect of the invention is a control method of a three-phase inverter system which includes the steps of detecting the output currents and output voltages of an inverter main circuit in three phases having a plurality of semiconductor switching devices, and making the semiconductor switching devices turned-on and -off by driving signals based on the output currents and output voltages, thereby converting a DC voltage into three-phase AC voltages to supply the converted three-phase AC voltages to a load. The method relates to a control method when the load is such a pulsating load as to cause pulsation in the output currents when being operated.

The invention is then characterized in that the control method further includes the steps of carrying out arithmetic operations on control commands for the semiconductor switching devices on the basis of the differences between the output voltages and their respective output voltage command values, carrying out arithmetic operations on the root mean square value and average value of the detected output currents of the inverter main circuit, dividing the root mean square value by the average value, carrying out arithmetic operation on a command compensation value proportional to the value of the result of the division of the root mean square value by the average value and, along with this, determining the turning-on and -off times of the driving signals by using the final control commands obtained by multiplying the control commands for the semiconductor switching devices by the command compensation value.

According to the invention, when a pulsating load such as an induction motor is driven by the three-phase inverter system, it is possible to suppress fluctuating components which are included due to the pulsating load in the voltages and currents inputted to and outputted from the three-phase inverter system. This makes it become possible to stabilize the voltages and currents which are inputted to and outputted from the three-phase inverter system and to also prevent fluorescent lights from flickering which are connected to the same feeding line as that to which the pulsating load is connected.

BRIEF DESCRIPTION OF THE DRAWINGS

FIGS. 3A to 3D are waveform diagrams showing the waveforms of the input voltage, input and output currents and command compensation value as the results of simulations carried out for explaining the advantage of the embodiment of the invention;

FIGS. 4A to 4D are waveform diagrams showing the waveforms of the input voltage, input and output currents and command compensation value as the results of simulations carried out for explaining the advantage of the embodiment of the invention;

DESCRIPTION OF THE PREFERRED EMBODIMENT

In the following, an embodiment of the invention will be explained with reference to the attached drawings.

Figure 1:
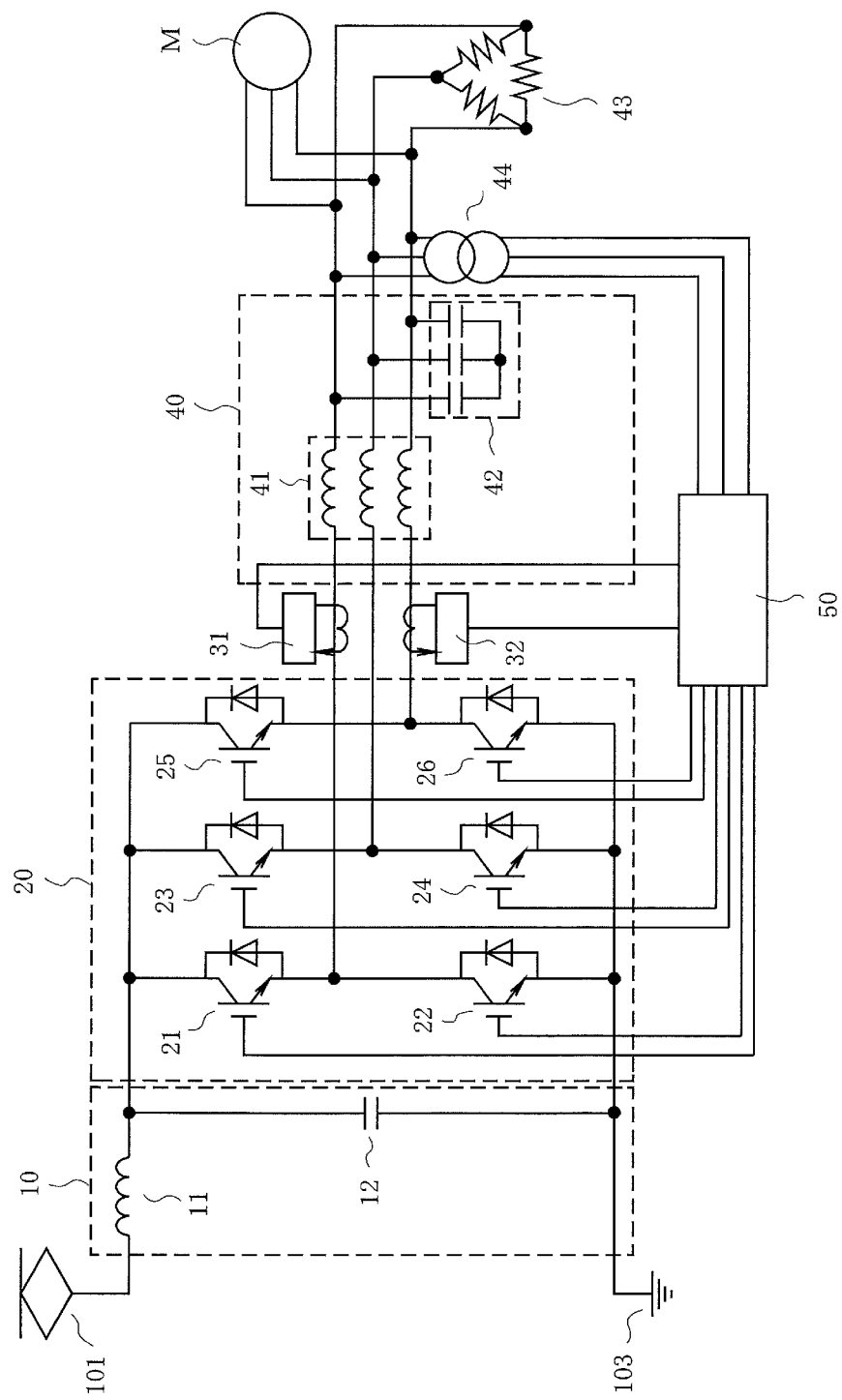
FIG. 1 is a block diagram schematically showing the whole configuration of a three-phase inverter system according to an embodiment of the invention and the control circuit thereof.

FIG. 1 is a block diagram schematically showing the whole configuration of a three-phase inverter system according to an embodiment of the invention and the control circuit thereof. The three-phase inverter system is one applied to an auxiliary power supply system mounted on a rolling stock in a DC feeding system, for example.

In FIG. 1, between a pantograph 101 and a grounding pint 103 (a wheel and a rail), an input side LC filter 10 is connected which is formed of a DC reactor 11 and a capacitor 12.

Across the capacitor 12, the DC input side of an inverter main circuit 20 is connected which has semiconductor switching devices 21 to 26 such as IGBTs (Insulated Gate Bipolar Transistors), for example, in a three-phase full-bridge connection. On the wires of two phases (U-phase and W-phase, for example) on the AC output side of the inverter main circuit 20, current detectors 31 and 32 are provided respectively.

For the semiconductor switching devices 21 to 26 in the inverter main circuit 20, in addition to the illustrated IGBTs, power semiconductor devices such as bipolar transistors, GTO (Gate Turn Off) thyristors and FETs (Field Effect Transistors) can be used.

The wire in each of the three phases on the AC output side of the inverter main circuit 20 is connected to a three-phase compressor motor M (hereinafter referred to as an induction motor M) and to a resistive load 43, formed of resistive load elements such as fluorescent lamps in delta connection to three-phase wires, for example, through an output side LC filter 40. The output side LC filter 40 is formed of an AC reactor 41 with reactor elements inserted in their respective three-phase wires and a capacitor 42 with capacitor elements in star connection to the three-phase wires.

To the three-phase wires between the output side LC filter 40 and the induction motor M, the primary side of a voltage detector (an instrument transformer) 44 is connected, onto the secondary side of which a control circuit 50 is connected.

The control circuit 50 carries out A/D (Analog to Digital) conversion of the detection values of output currents (first and second output current) provided by the current detectors 31 and 32 and the detection values of output voltages (first to third output voltages) provided by the voltage detector 44, carries out arithmetic operations such as PWM operations so that three-phase AC voltages with a constant magnitude and a constant frequency are made to be outputted from the inverter main circuit 20 and produces driving signals (gate signals) making the semiconductor switching devices 21 to 26 in the inverter main circuit 20 turned-on and -off.

In the foregoing configuration, the input side LC filter 10 smoothes the DC input voltage by eliminating ripples therefrom to input the smoothed DC input voltage to the inverter main circuit 20. The inverter main circuit 20 carries out turning-on and -off of the semiconductor switching devices 21 to 26 by the gate signals transmitted from the control circuit 50 to convert the DC input voltage into pulse-shaped three-phase AC voltages and output the AC voltages.

In addition, the output side LC filter 40 shapes the pulse-shaped AC output voltages into sinusoidal-wave-shaped voltages to supply the shaped voltages to the induction motor M and resistive load 43.

Incidentally, in the embodiment, the whole system including the input side LC filter 10, inverter main circuit 20, output side LC filter 40, current detectors 31 and 32, voltage detector 44 and control circuit 50 is to be referred as a three-phase inverter system.

Figure 2:
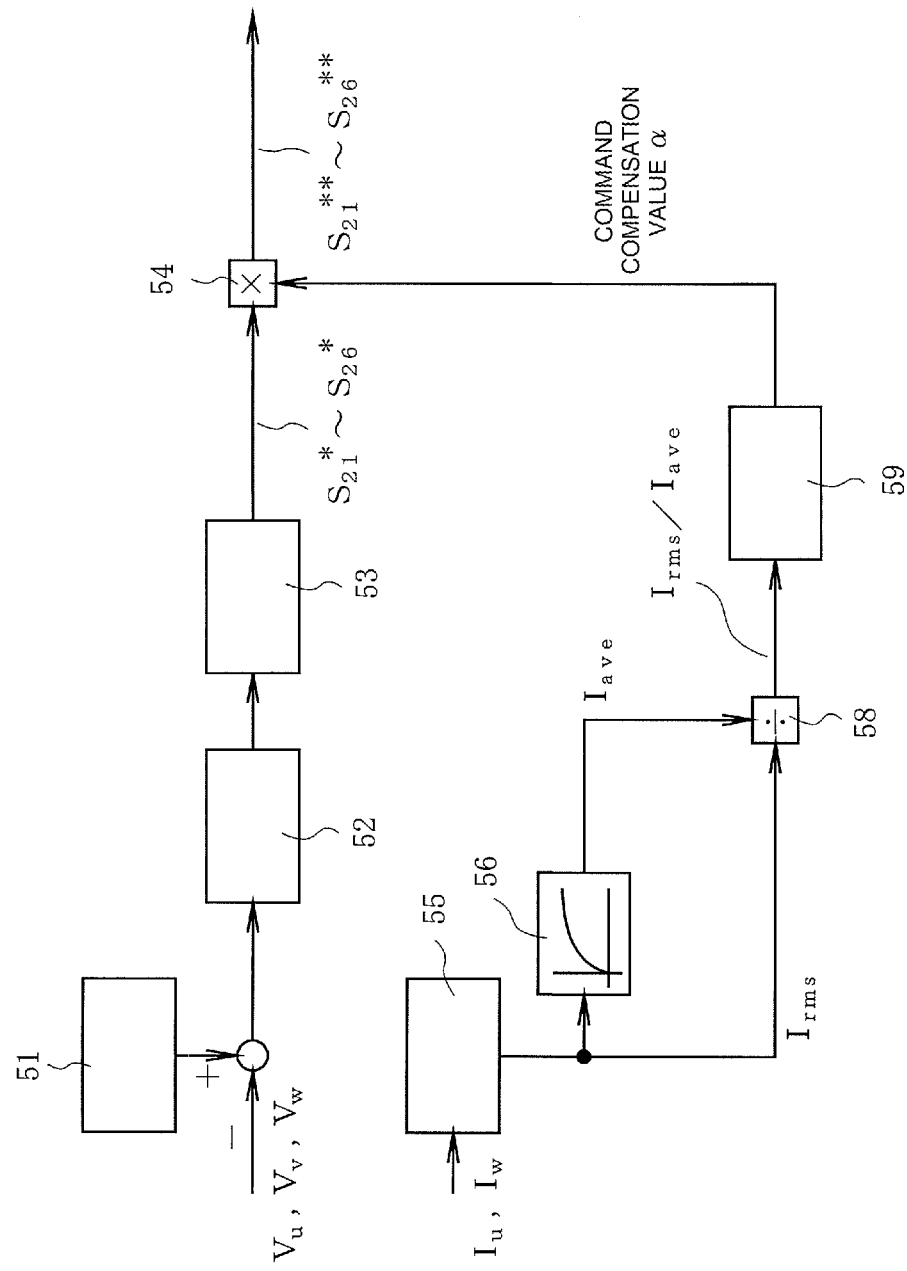
FIG. 2 is a block diagram showing the configuration of the principal part of the control circuit shown in FIG. 1.
Figure 5:
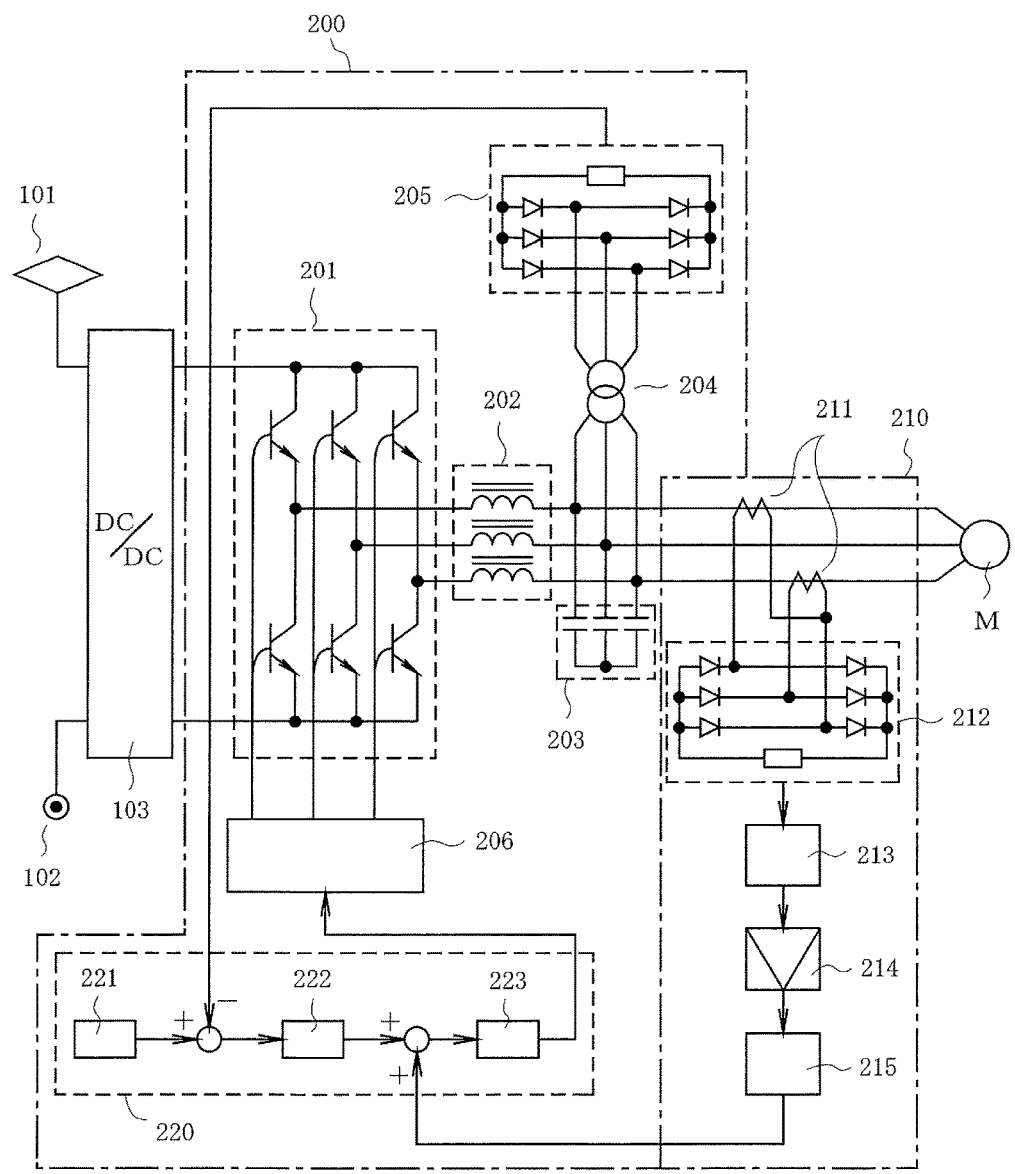
FIG. 5 is a diagram showing the whole configuration of a three-phase inverter system according to a first related art.
Figure 6:
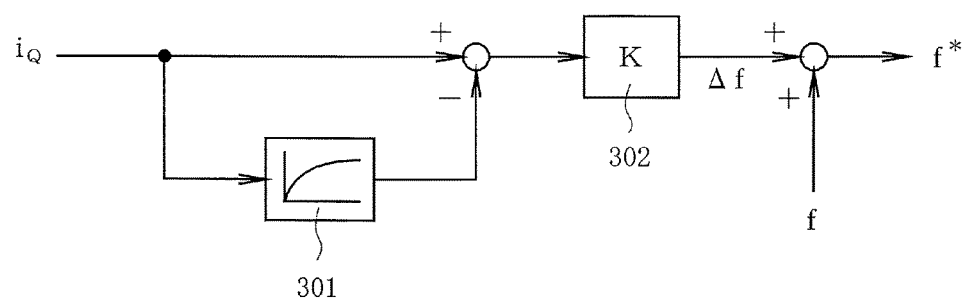
FIG. 6 is a diagram showing the configuration of the principal part of a three-phase inverter system according to a second related art.

In the next, FIG. 2 is a block diagram showing the configuration of the principal part of the control circuit 50 shown in FIG. 1, which is mainly actualized by the software of a microcomputer.

In the principal part of the control circuit 50 shown in FIG. 2, the digital values of the three-phase voltages $V_u$, $V_v$ and $V_w$ are obtained by carrying out A/D conversion of the output voltage values detected by the voltage detector 44. Then, the differences between the values of the voltages $V_u$, $V_v$ and $V_w$ and their respective output voltage command values 51 of the inverter main circuit 20 are inputted to a voltage stabilizing control section 52. The voltage stabilizing control section 52, on the basis of the differences, produces commands for providing each of the three-phase output voltages of the inverter main circuit 20 as a sinusoidal wave with a constant magnitude and frequency and outputs the commands.

The commands outputted from the voltage stabilizing control section 52 are inputted to a PWM operating section 53. In the PWM operation section 53, arithmetic operations are carried out for obtaining control commands $S_{21}^*$ to $S_{26}^*$ for determining turning-on and -off times for the semiconductor switching devices 21 to 26, respectively, in the inverter main circuit 20 and the obtained control commands $S_{21}^*$ to $S_{26}^*$ are outputted.

In the inverter main circuit 20, the output voltage in the U-phase is outputted by the operations of the semiconductor switching devices 21 and 22, the output voltage in the V-phase is outputted by the operations of the semiconductor switching devices 23 and 24 and the output voltage in the W-phase is outputted by the operations of the semiconductor switching devices 25 and 26.

While, the digital current values of the currents $I_u$ and $I_w$ in the U-phase and W-phase obtained by carrying out A/D conversion of the values of the output currents detected by the current detectors 31 and 32, respectively, are inputted to a root mean square value operation section 55. In the root mean square value operation section 55, arithmetic operation on the root mean square value $I_{rms}$ of the output currents of the inverter main circuit 20 as three-phase AC currents is carried out with the use of the digital current values $I_u$, $I_w$ and the digital current value $I_v$ (obtained as $I_v = 0 - I_u - I_w$) in the V-phase.

By making the root mean square value $I_{rms}$ of the output currents pass through a low-pass filter 56 as an average value operation section, the average value $I_{ave}$ of the output current in a period equivalent to the time constant of the low-pass filter 56 is operated.

In addition, by dividing the root mean square value $I_{rms}$ of the output currents by the average value $I_{ave}$ by a division section 58, a current ratio $I_{rms}/I_{ave}$ is obtained. The current ratio $I_{rms}/I_{ave}$ is equivalent to the ratio of the fluctuating component included in each of the output currents due to the operation of the induction motor M shown in FIG. 1 as a fluctuating load.

The current ratio $I_{rms}/I_{ave}$ fluctuates around the average value thereof.

Therefore, in a compensation value operation section 59, the current ratio $I_{rms}/I_{ave}$ is multiplied by a gain G with a specified value, by which the arithmetic operation on a command compensation value α is carried out. By inputting the command compensation value α to a multiplication section 54 to multiply the control commands $S_{21}{}^*$ to $S_{26}{}^*$, the arithmetic operations of obtaining the control command $S_{21}{}^{}$ to $S_{26}{}^{}$ after compensation (compensated control commands) are carried out, in which commands the levels of the control commands $S_{21}{}^*$ to $S_{26}{}^*$ are corrected.

Although not shown, the control command $S_{21}{}^{}$ to $S_{26}{}^{}$ are compared with a carrier as a series of triangular waves, for example, to be obtained as gate signals as being PWM signals. The gate signals become those having the turning-on and -off times of the semiconductor switching devices 21 to 26 corrected compared with the gate signals produced on the basis of the control commands $S_{21}{}^*$ to $S_{26}{}^*$ before the correction.

Namely, in the three-phase inverter system according to the embodiment, the root mean square value $I_{rms}$ of the output currents, including fluctuating components in the output currents of the inverter main circuit 20 due to the operation of the induction motor M as information, is made to be reflected in the command compensation value α. By carrying out arithmetic operations on the control commands $S_{21}{}^{}$ to $S_{26}{}^{}$ with the use of the command compensation value α, the turning-on and -off times of the semiconductor switching devices 21 to 26 are corrected.

This can suppress fluctuations in the output voltages and output currents of the three-phase inverter system to make it possible to prevent adverse effect (flickering) on the resistive load 43 formed of resistive load elements such as fluorescent lamps connected to the same feeding line as that to which the induction motor M is connected. Furthermore, it is also possible to suppress fluctuations in the input voltage (the voltage across the capacitor 12) and input current.

FIGS. 3A to 3D or FIGS. 4A to 4D are waveform diagrams showing the waveforms of the input voltage, input and output currents and command compensation value as the results of simulations carried out for explaining the advantage of the embodiment of the invention, respectively.

In the diagrams, FIG. 3A or FIG. 4A shows an input voltage to the three-phase inverter system (a voltage across the capacitor 12) when the induction motor M is started to be driven by the circuit shown in FIG. 1, FIG. 3B or FIG. 4B shows an input current at the time, FIG. 3C or FIG. 4C shows output currents at the time (in two phases) and FIG. 3D or FIG. 4D shows the command compensation value α.

Here, FIGS. 3A to 3D are the waveform diagrams when no compensation of the control commands $S_{21}{}^*$ to $S_{26}{}^*$ is carried out by the command compensation value α shown in FIG. 2 (that is, no compensation according to the invention is carried out) and FIGS. 4A to 4D are the waveform diagrams when the inverter main circuit 20 is controlled by using the control commands $S_{21}{}^{}$ to $S_{26}{}^{}$ obtained by correcting the control commands $S_{21}{}^*$ to $S_{26}{}^*$ by the command compensation value α (that is, when the compensation according to the invention is carried out).

Referring to FIGS. 3A to 3D, the start of the motor at time $t_0$ initiates fluctuations in the input voltage shown in FIG. 3A, the input current shown in FIG. 3B and the output currents shown in FIG. 3C. At time $t_1$ thereafter, the fluctuation widths of the output currents shown in FIG. 3C are approximately the minimum and the fluctuation width of the command compensation value α shown in FIG. 3D becomes approximately the maximum. Further, at time $t_2$, the fluctuation widths of the output currents shown in FIG. 3C are approximately the maximum and the fluctuation width of the command compensation value α shown in FIG. 3D becomes approximately the minimum.

Observations of the output currents shown in FIG. 3C and the command compensation value α shown in FIG. 3D along the time axis reveal that large and small in the magnitudes of the fluctuation widths of the output currents shown in FIG. 3C and those in the magnitude of the fluctuation width of the command compensation value α shown in FIG. 3D are inversely related on the whole and the command compensation value α with a specified magnitude is operated in synchronization with the fluctuations in the output currents.

While, referring to FIGS. 4A to 4D, by starting the operation of the induction motor M at the time $t_0$, the input voltage shown in FIG. 4A, the input current shown in FIG. 4B and the output voltages shown in FIG. 4C initiate to fluctuate, in almost the same as those in FIGS. 3A to 3C. In the simulation, however, the turning-on and -off times of the semiconductor switching devices 21 to 26 are controlled with the use of their respective control commands $S_{21}{}^{}$ to $S_{26}{}^{}$ after the compensation by the command compensation value α shown in FIG. 4D. Therefore, it is confirmed that the fluctuations in the voltage shown in FIG. 4A and currents shown in FIGS. 4B and 4C are gradually suppressed to be converged to their respective stabilized values.

The invention can be applied not only to the auxiliary power supply system for a rolling stock in a DC feeding system but also to various kinds of three-phase inverter systems driving pulsating loads such as induction motors and the control methods thereof.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A three-phase inverter apparatus, comprising:
   an inverter main circuit in three phases being configured to receive a DC voltage and output three-phase AC voltages and having a plurality of semiconductor switching devices each of which is configured to receive a compensated control command and be turned on and off so as to convert the DC voltage into the three-phase AC voltages to be supplied to a pulsating load that causes pulsation in output currents of the three-phase inverter apparatus when being operated;
   a current detector configured to detect first and second output currents from the inverter main circuit;
   a voltage detector configured to detect first to third output voltages from the inverter main circuit; and
   a control circuit configured to
      determine a root mean square value (RMS) of current using the first and second output currents output from the current detector, and an average value of the RMS,
      generate a command compensation value using a value obtained by dividing the RMS value by said average value,
      generate a plurality of control commands each of which is generated for a corresponding one of the plurality of semiconductor switching devices, using the first to third output voltages output from the voltage detector, and generate the compensated control command for each of the plurality of semiconductor switching devices by multiplying the command compensation value by a corresponding one of the plurality of control commands.

2. The three-phase inverter apparatus according to claim 1, wherein the control circuit includes
an RMS operation section configured to determine the RMS value,
an average value operation section configured to determine the average value of the RMS value;
a division section configured to divide the current RMS by said average value to obtain a current ratio;
a compensation value operation section configured to generate the command compensation value, wherein generate the command compensation value is proportional to the current ratio, and
a multiplication section configured to multiply each of the control commands by the command compensation value to compensate each of the plurality of control commands to generate the compensated control command for each of the plurality of semiconductor switching devices, the compensated control command determining timings for turning on and off a corresponding one of the plurality of semiconductor switching devices.

3. The three-phase inverter apparatus according to claim 1, wherein the control circuit generates the plurality of control commands using differences between the first to third output voltages and respective target values.

4. The three-phase inverter apparatus according to claim 1, wherein the three-phase inverter apparatus functions as a power supply apparatus driving an induction motor as the pulsating load in an electric rolling stock on a DC feeding system.

5. A three-phase inverter apparatus, comprising:
an inverter main circuit in three phases having a plurality of semiconductor switching devices, the plurality of semiconductor switching devices performing turning-on and -off operations so as to convert a DC voltage into three-phase AC voltages to supply the converted three-phase AC voltages to a load, the load being a pulsating load causing pulsation in output currents of the three-phase inverter apparatus when being operated;
a current detector configured to detect first and second output currents of the inverter main circuit;
a voltage detector configured to detect first to third output voltages of the inverter main circuit; and
a control circuit configured to receive the first and second output currents and the first to third output voltages and generate a plurality of driving signals each of which turns a corresponding one of the plurality of semiconductor switching devices ON/OFF, the control circuit including
a root mean square value operation section configured to determine a root mean square value using the first and second output currents;
an averaged value operation section configured to determine an average value of the root means square value;
a division section configured to divide the root mean square value by the average value;
a compensation value operation section configured to generate a command compensation value that is proportional to a value output from the division section; and a multiplication section configured to multiply each of the control commands for the semiconductor switching devices by the command compensation value to compensate the control commands, the multiplication section outputting compensated control commands to determine length for turning-on and -off of each of the plurality of the semiconductor switching devices, the control commands being operated on the basis of the differences between the output voltages and their respective output voltage command values.

6. The three-phase inverter system as claimed in claim 5, wherein the three-phase inverter system forms a power supply system driving an induction motor as the pulsating load in an electric rolling stock on a DC feeding system.

7. A control method for a three-phase inverter apparatus that includes an inverter main circuit in three phases, which receives a DC voltage and outputs three-phase AC voltages and has a plurality of semiconductor switching devices each of which receives a compensated control command and is turned on and off so as to convert the DC voltage into the three-phase AC voltages to be supplied to a pulsating load that causes pulsation in output currents of the three-phase inverter apparatus when being operated, a current detector that detects first and second output currents from the inverter main circuit, and a voltage detector that detects first to third output voltages from the inverter main circuit, the method comprising:
determining a root mean square value (RMS) of current using the first and second output currents output from the current detector, and an average value of the RMS value,
generating a command compensation value using a value obtained by dividing the RMS value by said average value of the RMS value,
generating a plurality of control commands each of which is generated for a corresponding one of the plurality of semiconductor switching devices, using the first to third output voltages output from the voltage detector, and
generating the compensated control command for each of the plurality of semiconductor switching devices by multiplying the command compensation value by a corresponding one of the plurality of control commands.

8. The control method for a three-phase inverter apparatus according to claim 7, wherein
said generating a command compensation value includes dividing the RMS value by its average value to obtain a current ratio, and generating the command compensation value that is proportional to the current ratio obtained by the division section, and
each of the compensated control commands determines timings for turning on and off a corresponding one of the plurality of semiconductor switching devices.

9. The control method for a three-phase inverter apparatus according to claim 7, wherein the plurality of control commands are generated using differences between the first to third output voltages and respective target values.

10. The control method for three-phase inverter apparatus according to claim 7, including using the three-phase inverter apparatus as a power supply apparatus to drive an induction motor as the pulsating load in an electric rolling stock on a DC feeding system.

11. A control method of a three-phase inverter system, comprising the steps of:

detecting currents and voltages output in three phases by an inverter main circuit having a plurality of semiconductor switching devices; and making the semiconductor switching devices turned-on and -off by driving signals based on the output currents and output voltages, thereby converting a DC voltage into three-phase AC voltages to supply the converted three-phase AC voltages to a load, the load being a pulsating load causing pulsation in the output currents of the three-phase inverter system when being operated, carrying out arithmetic operations on control commands for the semiconductor switching devices on the basis of the differences between the output voltages and their respective output voltage command values;

carrying out arithmetic operations on a root mean square value of the detected output currents and an average value of the root mean square value;

dividing the root mean square value by the average value;

carrying out arithmetic operation on a command compensation value proportional to the value of the result of the division of the root mean square value by the average value; and determining the turning-on and -off times of the driving signals using final control commands obtained by multiplying the control commands for the semiconductor switching devices by the command compensation value.

* * * * *